(12) United States Patent
Mei et al.

(10) Patent No.: US 8,140,532 B2
(45) Date of Patent: Mar. 20, 2012

(54) SYSTEM FOR SORTING AND CLASSIFYING USERS OF AN IMAGE INFORMATION MANAGEMENT SYSTEM

(75) Inventors: Shishu Mei, Beijing (CN); Zhen Wang, Beijing (CN); Xiaodong Wu, Beijing (CN)

(73) Assignee: Beijing Chaoy Ang Info-Net Center, Beijing (CN)

( * ) Notice: Subject to any disclaimer, the term of this patent is extended or adjusted under 35 U.S.C. 154(b) by 120 days.

(21) Appl. No.: 12/674,883

(22) PCT Filed: Aug. 22, 2008

(86) PCT No.: PCT/CN2008/072104
§ 371 (c)(1), (2), (4) Date: May 6, 2010

(87) PCT Pub. No.: WO2009/026840
PCT Pub. Date: Mar. 5, 2009

(65) Prior Publication Data
US 2011/0055211 A1    Mar. 3, 2011

(30) Foreign Application Priority Data
Aug. 24, 2007  (CN) .......................... 2007 1 0147543

(51) Int. Cl.
*G06F 17/30* (2006.01)
(52) U.S. Cl. ......... 707/737; 707/752; 707/758; 707/785
(58) Field of Classification Search .................. 707/737
See application file for complete search history.

(56) References Cited

U.S. PATENT DOCUMENTS

| | | | | |
|---|---|---|---|---|
| 4,357,529 A | * | 11/1982 | Atalla | 705/72 |
| 5,384,449 A | * | 1/1995 | Peirce | 235/380 |
| 2003/0140044 A1 | * | 7/2003 | Mok et al. | 707/10 |
| 2004/0146272 A1 | * | 7/2004 | Kessel et al. | 386/46 |
| 2006/0159302 A1 | * | 7/2006 | Goldberg et al. | 382/100 |
| 2007/0067465 A1 | * | 3/2007 | Blinn et al. | 709/229 |
| 2007/0249332 A1 | * | 10/2007 | Matsuhashi | 455/422.1 |
| 2011/0243594 A1 | * | 10/2011 | Saito | 399/70 |

FOREIGN PATENT DOCUMENTS

| | | |
|---|---|---|
| CN | 1761320 A | 4/2006 |
| CN | 1889427 A | 1/2007 |
| CN | 1905455 A | 1/2007 |
| CN | 101102483 A | 1/2008 |
| WO | 2005/091560 A1 | 9/2005 |

* cited by examiner

*Primary Examiner* — Don Wong
*Assistant Examiner* — Binh V Ho
(74) *Attorney, Agent, or Firm* — Sughrue Mion, PLLC (57) ABSTRACT

A system for sorting and classifying users of an image information management system is disclosed. The system for sorting and classifying users of an image information management system according to the present invention comprises some identical sub-systems, and every two sub-systems are interconnected. The sub-system comprises a user information encoding module, a user information decoding and authority identifying module, a user sorting module, a user classifying module, a command performing module, an authorized user collection database and a resource information database. The resource information database comprises real-time images, history images and control right commands of cradle heads and lens of cameras. The present invention resolves the problem of ordered accessing and utilizing of image information in a super-large-scale advanced real-time monitoring information management system, and realizes the object that local failures do not affect the normal work of the other parts by connecting every two sub-systems to each other and arranging the user identification entrance in each one of sub-systems.

16 Claims, 3 Drawing Sheets

SYSTEM FOR SORTING AND CLASSIFYING USERS OF AN IMAGE INFORMATION MANAGEMENT SYSTEM

CROSS REFERENCE TO RELATED APPLICATIONS

This application is a National Stage of International Application No. PCT/CN2008/072104 filed Aug. 22, 2008, claiming priority based on Chinese Patent Application No. 200710147543.6, filed Aug. 24, 2007, the contents of all of which are incorporated herein by reference in their entirety.

FIELD OF THE INVENTION

The present invention relates to a management system for sorting and classifying users of an image information management system.

BACKGROUND OF THE INVENTION

The existing real-time monitoring information management network includes a central control station and several video cameras, and has a small scale. In the real-time monitoring information management network, which is a relatively independent system, the use and control of resources by each user is enabled through a direct correspondence relationship between the user and a single resource, and the relationship is relatively fixed. With the continuous development and progress of the society and hence the increasing mobility of people, there is a need for integrating the separate image information management systems to construct a high-level image information management system including a plurality of sub-systems. However, the existing user management approach is incapable of adjusting and modifying priorities and resources of users flexibly, so that the requirement of super large scale of video networking cannot be satisfied, and a problem such as an access beyond authority and a multi-user access conflict may be caused. Further, the large scale network system may be easily crashed due to a failure of the central server.

SUMMARY OF THE INVENTION

In the present invention, the authorities and sorts of the users are defined and identified, so that the image information can be accessed and utilized in order in the super large scale of high-level real-time-monitoring information management system. Further, by providing the user identification entrance at each of the subsystems, a local failure in the whole system is prevented from affecting the operation of other parts of the system.

Embodiments of the present invention provide the following technical solutions.

An embodiment of the present invention provides a management system of sorting and classifying users of an image information management system, comprising a number of subsystems which are the same and interconnected to each other, wherein the subsystem comprises a user information encoding module, a user information decoding and authority identifying module, a user sorting module, a user classifying module, a command executing module, a database of authorized user set and a resource information database. The resource information database contains real-time images, history images, and a control command on a pan head and a lens of a video camera. The user information encoding module is adapted to encode a use command and user personal information containing access level information into a digital string based on predefined rules, and transmit the digital string to the user information decoding and authority identifying module of the subsystem including the resource information indicated by the use command; the user information decoding and authority identifying module is adapted to obtain a user record from the database of authorized user set, decode the user information contained in the received digital string, and compare the use command with an authorization record of the user in the database of authorized user set, in order to identify whether the user possesses an operation authority; after the identification, the user sorting module is informed of the user possessing the operation authority, and transmits to the user classifying module a list of users each initiating access commands to the same resource within a certain time period; and the user classifying module is adapted to arrange orderly the users initiating the access commands to the same resource according to access levels, and send the use commands of the users to the command executing module in sequence for executing.

The resource information database is divided into a number of sub-databases containing the respective resource information sorted based on given rules. The given rules may be determined by a management person depending on applications.

The user personal information comprises user level information and information of identification of the subsystem containing the user personal information, both of which are encoded and indicated based on the given rule, and a user with a higher level has a priority of accessing the same resource information over a user with a lower level. The management system of claim 1 or 2, wherein the operation authority comprises an authority of obtaining the real-time images from the video camera, an authority of obtaining the history image, or an authority of controlling the pan head and lens of the video camera.

The use command comprises a command to obtain the real-time image from the video camera, obtain the history image, or obtain control of the pan head and lens of the video camera.

According to the use commands of the users, the user sorting module divides the users into users of obtaining the real-time image from the video camera, users of obtaining the history image, and users of obtaining an authority of controlling the pan head and lens of the video camera, and arranges respectively the users into a list of users directed to the corresponding resource information.

The user classifying module sorts, from a high priority to a low priority, the users in the user list from the user sorting module by sorting the priority of accessing the real-time image from the video camera, accessing the history image, and controlling the pan head and lens of the video camera, and sends the priorities to the command executing module in sequence for executing.

The resource information database is divided into a number of sub-databases containing various resource information according to given rules.

Preferably, the above management system of sorting and classifying users of an image information management system is further provided with a global control station which includes a database of authorized user set, and the database of authorized user set comprises all of records in the database of authorized user set of each of the subsystems. In the case of a normal state of the system, the user information decoding and authority identifying module can obtain user records from either the database of authorized user set of the global control station or the database of authorized user set of the corresponding subsystem, decode the user information contained in the received digital string, and compare the use command with an authorization record of the user in the database of authorized user set, in order to identify whether the user possesses an operation authority.

The records in the databases of authorized user set of different subsystems may be the same or different, and are set in the respective subsystems.

The management system of sorting and classifying users of an image information management system further comprises an information feedback module adapted to send image information, which is obtained from executing a command by the command executing module, to a user indicated by the command.

The management system of sorting and classifying users of an image information management system further comprises an information feedback module adapted to send image information, which is obtained from executing a command by the command executing module, to a user indicated by the command.

The present invention has the following technical effects.

In the present invention, the authorities and sorts of the users are defined and identified, so that the image information can be accessed and utilized in order in the super large scale of high-level real-time-monitoring information management system. Further, by connecting the subsystems with each other and providing the user identification entrance at each of the subsystems, a local failure in the whole system is prevented from affecting the operation of other parts of the system. In the case that a subsystem in the whole system is failed, information exchange between other subsystems is not affected.

DETAILED DESCRIPTION OF THE EMBODIMENTS

Figure 1:
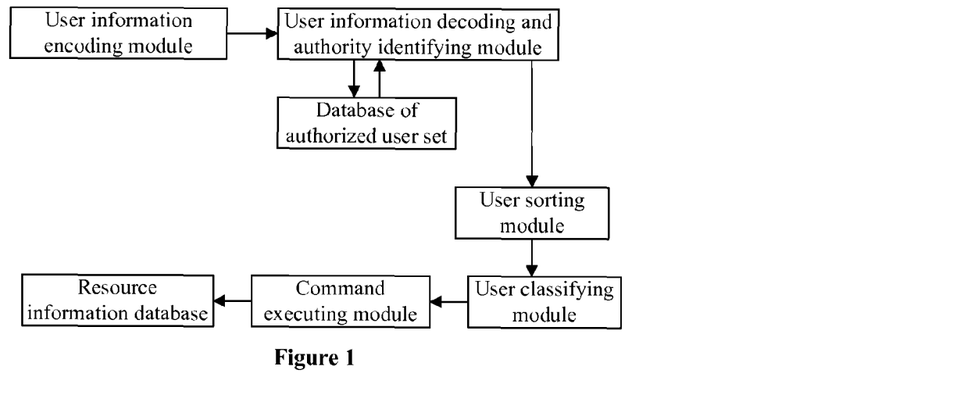
FIG. 1 is a schematic diagram of a subsystem of a management system of sorting and classifying users of an image information management system.
Figure 2:
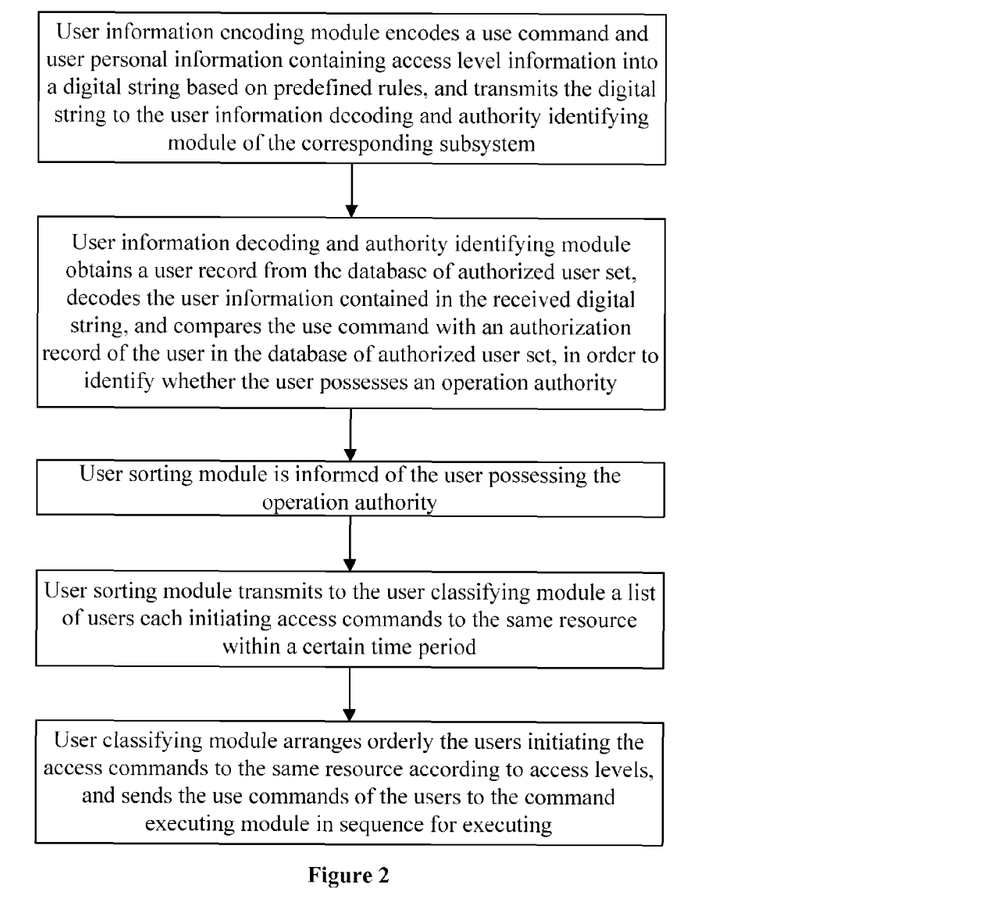
FIG. 2 is a schematic diagram of an operation flow of the management system of sorting and classifying users of an image information management system.
Figure 3:
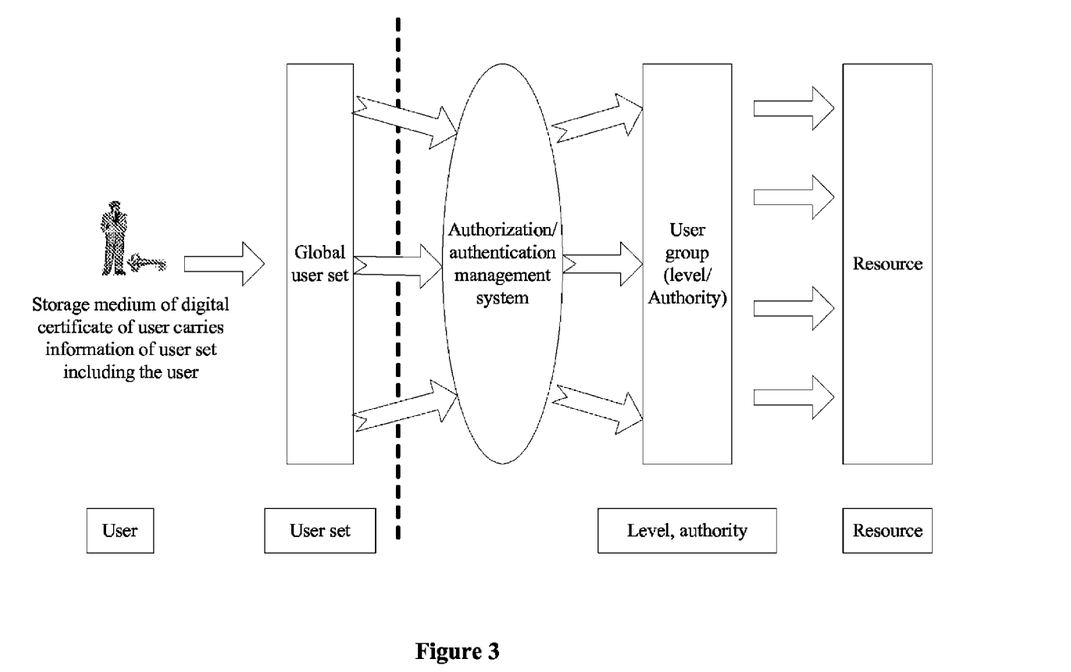
FIG. 3 is a schematic diagram of authorizing a user.
Figure 4:
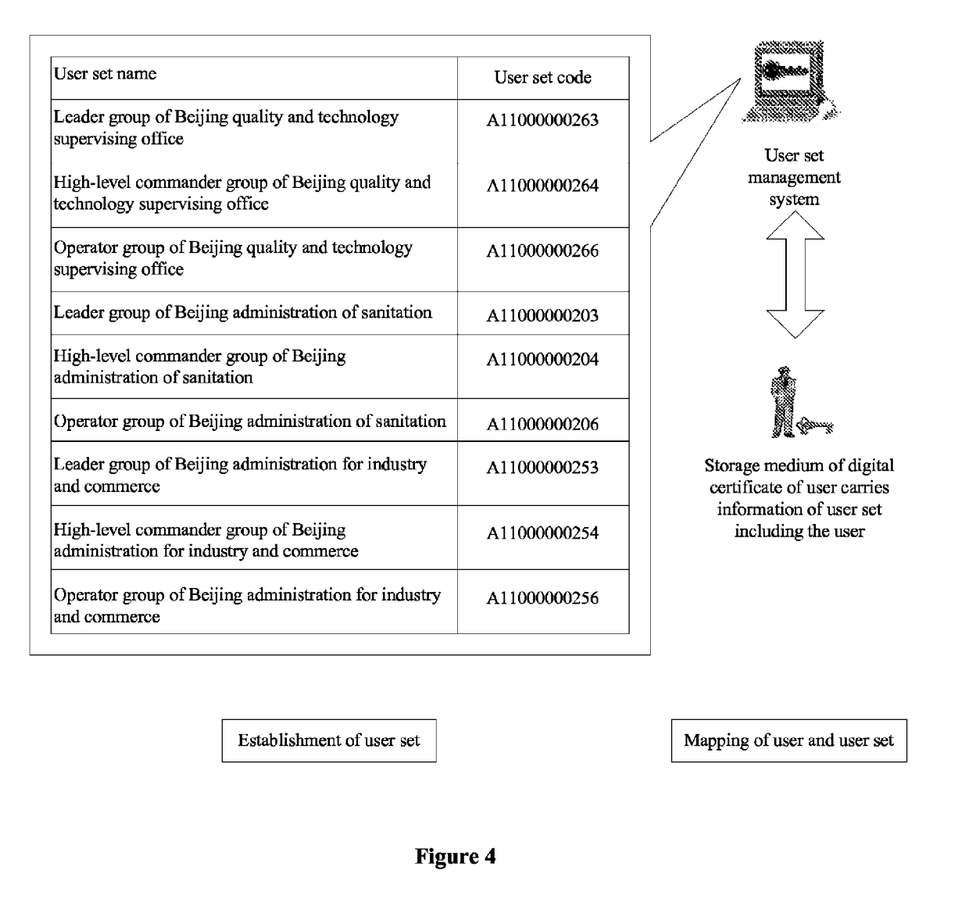
FIG. 4 is a schematic diagram of mapping between a user and a user set.

A first embodiment of a method of utilizing image resources by a user across platforms in a Beijing image information management system is illustrated below.

The embodiment of the invention provides a management system of sorting and classifying users of an image information management system, which includes several subsystems which are the same and interconnected to each other. The subsystem includes a user information encoding module, a user information decoding and authority identifying module, a user sorting module, a user classifying module, a command executing module, a database of authorized user set and a resource information database. The resource information database contains real-time images, history images, and a control command on a pan head and a lens of a video camera. The user information encoding module is adapted to encode a use command and user personal information containing access level information into a digital string based on pre-defined rules, and transmit the digital string to the user information decoding and authority identifying module of the subsystem including the resource information indicated by the use command. The user information decoding and authority identifying module is adapted to obtain a user record from the database of authorized user set, decode the user information contained in the received digital string, and compare the use command with an authorization record of the user in the database of authorized user set, in order to identify whether the user possesses an operation authority; after the identification, the user sorting module is informed of the user possessing the operation authority, and transmits to the user classifying module a list of users each initiating access commands to the same resource within a certain time period, and then the user classifying module arranges orderly the users initiating the access commands to the same resource according to access levels, and sends the use commands of the users to the command executing module in sequence.

The resource information database includes several sub-databases which contains various resource information sorted according to a given rule.

The user personal information includes the user level information and information of identification of the subsystem containing the user personal information, both of which are encoded and indicated based on the given rule. A user with a higher level has a priority of accessing the same resource information over a user with a lower level. The access authority may include an authority of obtaining a real-time image from a video camera, an authority of obtaining a history image, or an authority of controlling the pan head and lens of the video camera.

The use command refers to a command to obtain a real-time image from a video camera, a history image, or control of the pan head and lens of the video camera.

According to the use commands of the users, the user sorting module divides the users into users of obtaining a real-time image from a video camera, users of obtaining a history image, and users of obtaining an authority of controlling the pan head and lens of the video camera, and arranges respectively the users into a list of users directed to the corresponding resource information.

The user classifying module sorts, from a high priority to a low priority, the users in the user list from the user sorting module by sorting the priority of accessing the real-time image from the video camera, accessing the history image, and controlling the pan head and lens of the video camera, and sends the priorities to the command executing module in sequence for executing.

The resource information database is divided into several sub-databases containing various resource information according to given rules.

By dividing the image resources and sorting and managing the control authorities in the invention, a global user is enabled to access image resources on platforms in various districts and counties and dedicated platforms (i.e. across platforms), and it is ensured that the desired image resources are used by the users in order in both normal and urgent conditions.

To use image resources across platforms, the users are required to be authenticated and authorized. In the case of an authority conflict, a resource management platform determines the authority. The image resources include real-time images and history images of the video camera, etc, and the management of the image resources is conducted by the respective management platforms. For example, an operator using image resources of Beijing Image Information Management System is referred to as a user, and a user capable of operating image resources across platforms is referred to as a global user. A global user management unit may add, modify and delete the global user depending on application requirements and the related regulations.

The global user may be enabled to access resources across platforms as follows:

User access and control authorities of image resources are divided into real-time observing, controlling, locking/unlocking.

Generally, the relationship between the access and control authorities may be locking/unlocking>control>real-time observing, and the authorities may be combined as below:

real-time observing, real-time control, and locking/unlocking; real-time observing and real-time control; and real-time observing.

The image resources are sorted according to the concern degrees of administrative management departments, for example, into categories such as public security, sanitation, water affairs. A certain kind of resources attracting attention of multiple departments need to be further divided.

Each of the platforms may manage the image resources in general or by sorts.

The database of authorized user set may include several sub-databases, in which users are divided into various user subsets depending on their departments, positions and resource usage requirements, and a user subset refers to a set of users with the same use characteristics. The user set is divided into a general user set and a special user subset, and the special user subset is preserved for decision leaders and emergency leaders at the municipality level.

All of the users are encoded according to predefined user set encoding rules which include the use characteristic information and departments of the users and administrative regionalization information.

The global user management unit allocates for each user a USB-KEY, which contains personal identity information of the user, a unit certificate, a public key, and so on, and writes information of the user set including the user into the USB-KEY depending on service requirements to complete a mapping between the user and the user set. One user may belong to one or more user subsets.

Each management platform establishes a list of user groups according to resource sorts and access requirements of user sets, and determines the authority and the priority order of each user group. Typically, a normal user group and an emergency user group are established.

Each management platform sets a priority level denoted by 0 to 255 for a user group, where 250 to 255 are reserved. The user group with the same authority is designated with a level according to the access requirements of the user group by the management platform.

At each management platform, the highest level codes of 250-254 are reserved for decision leaders and emergency leaders at the municipality level, and 255 is reserved for a platform administrator.

With the USB-KEY, the user logins the system to access some image resource. The user management system identifies the validity of the identity of the user, and sends the information of the user set including the user to the management platform containing the image resource.

An authority management system of each management platform is responsible for establishing the user groups and setting the corresponding levels. The management platform puts a user set to the predefined user group according to the video resource requirements of the user set. The user sets with access requirements are sorted as per their priorities through the mapping of the user group.

When multiple users desire to control the same video source, the user having the highest level of priority of controlling the video source is determined through the priorities of the user groups corresponding to the user sets. If the multiple users belong to the same user group, the user firstly applying for controlling the video source takes the priority of controlling the video source.

In the present invention, the authorities and sorts of the users are defined and identified, so that the image information can be accessed and utilized in order in the super large scale of high-level real-time-monitoring information management system. Further, by connecting the subsystems with each other and providing the user identification entrance at each of the subsystems, a local failure in the whole system is prevented from affecting the operation of other parts of the system. In the case that a subsystem in the whole system is failed, information exchange between other subsystems is not affected, and even only the remaining two normal subsystems may exchange information normally.

A Second Embodiment

The present embodiment of the invention provides a management system of sorting and classifying users of an image information management system, which includes several subsystems which are the same and interconnected to each other. The subsystem includes a user information encoding module, a user information decoding and authority identifying module, a user sorting module, a user classifying module, a command executing module, a database of authorized user set and a resource information database. The resource information database contains real-time images, history images, and a control command on a pan head and a lens of a video camera. The user information encoding module is adapted to encode a use command and user personal information containing access level information into a digital string based on predefined rules, and transmit the digital string to the user information decoding and authority identifying module of the subsystem including the resource information indicated by the use command. The user information decoding and authority identifying module is adapted to obtain a user record from the database of authorized user set, decode the user information contained in the received digital string, and compare the use command with an authorization record of the user in the database of authorized user set, in order to identify whether the user possesses an operation authority; after the identification, the user sorting module is informed of the user possessing the operation authority, and transmits to the user classifying module a list of users each initiating access commands to the same resource within a certain time period, and then the user classifying module arranges orderly the users initiating the access commands to the same resource according to access levels, and sends the use commands of the users to the command executing module in sequence.

The personal information of the user includes level information of the user and information of identification of the subsystem containing the personal information of the user, both of which are encoded and indicated based on the given rule. A user with a higher level has a priority of accessing the same resource information over a user with a lower level. The access authority may include an authority of obtaining a real-time image from a video camera, an authority of obtaining a history image, or an authority of controlling the pan head and lens of the video camera.

The use command refers to a command to obtain a real-time image from a video camera, a history image, or control of the pan head and lens of the video camera.

According to the use commands of the users, the user sorting module divides the users into users of obtaining a real-time image from a video camera, users of obtaining a history image, and users of obtaining an authority of controlling the pan head and lens of the video camera, and arranges respectively the users into a list of users directed to the corresponding resource information.

The user classifying module sorts, from a high priority to a low priority, the users in the user list from the user sorting module by sorting the priority of accessing the real-time image from the video camera, accessing the history image, and controlling the pan head and lens of the video camera, and sends the priorities to the command executing module in sequence for executing.

The present embodiment defines the dividing and encoding of the user sets, sorting of image resources and sorting of access control authorities in the image information management system; further, the embodiment regulates the authorization procedure for the global user accessing the image resources at the platforms in various districts and counties and the dedicated platform (i.e. across platforms).

Terms and Definitions.

Resources: Real-time images and history images of a video camera.

User: An operator who desires to use resources in the platform. The users may be divided into global users and local users. The global user refers to one who is capable of operating the image resources across platforms, and the local user refers to one who is capable of operating the image resources within the local platform only.

Global user management unit: An organization adapted to add, modify and delete a global user according to application requirements and the related regulations.

User set: A set of users with relatively uniform use characteristics.

Authority: A user capability of accessing and controlling video resources.

Level: A level is used for representing an order of accessing the same resource by different user sets, and is denoted by 0 to 255, with a different value representing a different level, where the larger the value is, the higher the level is.

User group: A set of user sets determined by a management platform according to application requirements and resource characteristics, and the same user group has the same authority and level with respect to a particular resource.

Lock/unlock: Lock means that the control authority of a channel of real-time images is protected when the real-time images are observed and the pan head and lens of the video camera are under control against operating of the pan head and lens of the video camera by other user. Unlock means releasing the lock of the control authority of the real-time image.

Dividing of a User Set and a User Set Code

Dividing of a user set: User sets are divided into a general user set and a special user set depending on properties of the user sets.

Special user set: Decision leaders and emergency leaders at the municipality level.

General user set: Users in each unit are divided into five user sets including leaders, high-level commanders, commanders, operators and assistants in a high-to-low order of priorities of the users. One or more of the user sets may be used by the unit of the users depending upon the actual application requirements.

For example, users in Beijing statistics office may be divided into five user sets including statistics office leaders, statistics office high-level commanders, statistics office commanders, statistics office operators and statistics office assistants; and users in Beijing cultural office may be divided into three user sets including cultural office leaders, cultural office commanders and cultural office assistants.

User set code: A user set code consists of a property code, an administrative regionalization code, a user unit code and a user set identity code.

The user set code has a fixed total length of 12 bits with the following structure.

| X | XXXXXX | XXXX | X |
|---|---|---|---|
| Property Code | Administrative Regionalization Code | User Unit Code | User Set Identity Code |

Property code: The property code indicates an operative range of a user set. The property code of a global user set capable of accessing resources across platforms is denoted by "A", and codes of B to Z are reserved.

Administrative regionalization code: The administrative regionalization codes of Beijing are shown in Table 1 below.

TABLE 1

Administrative regionalization codes of Beijing

| Sequence numbers | Administrative regionalization names | codes |
|---|---|---|
| 1 | Beijing | 110000 |
| 2 | Dongcheng District | 110101 |
| 3 | Xicheng District | 110102 |
| 4 | Chongwen District | 110103 |
| 5 | Xuanwu District | 110104 |
| 6 | Chaoyang District | 110105 |
| 7 | Fengtai District | 110106 |
| 8 | Shijingshan District | 110107 |
| 9 | Haidian District | 110108 |
| 10 | Mentougou District | 110109 |
| 11 | Fangshan District | 110111 |
| 12 | Tongzhou District | 110112 |
| 13 | Shunyi District | 110113 |
| 14 | Changping District | 110114 |
| 15 | Daxing District | 110115 |
| 16 | Huairou District | 110116 |
| 17 | Pinggu District | 110117 |
| 18 | Miyun County | 110228 |
| 19 | Yanqing County | 110229 |

User unit code: A user unit code refers to an individual level of administrative unit.

The user unit code has a fixed length of 4 bits, and encoded as 0001 to 9999 in sequence. The administrative unit code of each county corresponding to the municipality level is required to be consistent with the corresponding unit code at the municipality level.

User set identity code: The user set identity code has a fixed length of 1 bit, and encoded as 1 to 9 in sequence, as shown in Table 2 below.

TABLE 2

User set identity code table

| Code | Name of user set identity code |
|---|---|
| 1 | Decision leader at the municipality level |
| 2 | Emergency leader at the municipality level |
| 3 | Leader |
| 4 | High-level commander |
| 5 | Commander |
| 6 | Operator |
| 7 | Assistant |
| 8-9 | Reserved |

Examples of user set codes are shown below:

A user set of leaders in Beijing quality and technology supervising office: A11000000423

A user set of high-level commanders in municipal and administrative committee at Dongcheng District: A11010100084

Resource Sorting and Access Authority

Resource sorting: Image resources are sorted according to the concern degree of administrative management department according characteristics of image resources in the respective platforms.

Sorting principles: Resources are sorted according to the concerns on the resources in terms of administrative management departments.

Sorting procedures: The resources are sorted according to the concerns putted on the resources by the various administrative management departments; the resources are subsequently subdivided according to the concerns putted on the resources by the various administrative management departments; and so on. The levels of the subdivision are determined by the management platforms as desired individually.

For example, all of the resources are sorted into categories such as public security, sanitation, water affairs. The resources in the category of public security are subdivided in terms of various units concerning on the resources. The subdivision of the remaining resources is determined by the respective management platforms.

Sorting of access authority: The authorities of accessing and controlling resources in a system may be divided into 3 sorts including real-time observing, controlling, and locking/unlocking.

In the case of real-time observing, it is possible to observe real-time images, but not control the pan head and lens. The real-time observing is divided into requesting video and releasing video.

In the case of controlling, it is possible to control the pan head and lens whiling observing the real-time images.

In the case of locking/unlocking, it is possible to set a particular video source to a lock or unlock state.

User authorization: User authorization means allocating resources and authorities for a user by a management platform, so that the user is capable of accessing the designated video source.

More details of the terms are given below.

1.1 User Set 1.1.1 The global user management unit establishes and encodes a global user set according to the present criteria.

1.1.2 A digital certificate of each user contains personal identity information of the user, and information of a user set including the user is stored in the storage medium of the digital certificate.

1.1.3 The global user management unit writes the information of the user set including the user into the storage medium of the digital certificate of the user, to complete the mapping between the user and the user set.

1.1.4 Any user may belong to one or more user sets.

1.2 User Group 1.2.1 The management platform establishes a list of user groups according the resource sorting and access requirements of the user sets, and determines the authority and priority of each user group.

1.2.2 Based on the video resource requirements of a user set, the management platform puts the user set to a determined user group, and multiple user sets may belong to the same user group. Typically, a normal user group and an emergency user group may be established.

1.2.3 The management platform may provide a user group with a corresponding defined priority level which may be denoted by 0 to 255, where 250 to 255 are reserved. The user groups with the same authority are provided with defined levels by the management platform according to access requirements of the user groups.

1.2.4 In each management platform, the highest levels of codes (i.e. 250 to 254) are reserved for decision leaders and emergency leaders at the municipality level, and 255 is reserved for a platform administrator.

1.2.5 Generally, the relationship between the access authorities may be locking/unlocking>control>real-time observing, and the authorities may be combined as below:

Real-time observing, real-time control, and locking/unlocking;

Real-time observing and real-time control; and

Real-time observing.

1.2.6 Typically, the kinds of authorities of user groups with higher priorities are no less than the kinds of authorities of user groups with lower priorities.

TABLE 3

Schematic table of combination of levels and authorities of user groups
User Groups

| Level | Authority Combination |
|---|---|
| 249 | Real-time observing, real-time control, and locking/unlocking |
| 248 | Real-time observing, real-time control, and locking/unlocking |
| 247 | Real-time observing, real-time control, and locking/unlocking |
| ... | |
| 200 | Real-time observing, and real-time control |
| 199 | Real-time observing, and real-time control |
| 198 | Real-time observing, and real-time control |
| ... | |
| 100 | Real-time observing |
| 99 | Real-time observing |
| 98 | Real-time observing |
| ... | |

1.3 Resource Accessing and Controlling 1.3.1 Each platform may manage the resources either individually or by sorts.

1.3.2 A particular user group may have a particular authority and a particular access priority for a video resource.

1.3.3 User sets with access requirements are sorted in priorities through the mapping of user groups.

For example, in the case of a video source possessed by a police system, units such as a city administration unit and a traffic administration unit may need to share the video source, and a user group including a police user set is established to have a higher priority than user groups including a city administration user set and a traffic administration user set in establishing user groups.

For example, in the case of a unit which includes five user sets of leaders, high-level commanders, commanders, operators and assistants according to standard regulations, when user groups are determined, the user groups including respectively the five user sets have a priority order of a user group including leaders, a user group including high-level commanders, a user group including commanders, a user group including operators and a user group including assistants.

1.4 EXAMPLE

TABLE 4

An example table of mapping between user sets and user groups

| User set name | User set code | User group | | |
|---|---|---|---|---|
| | | Level | Authority | Video source code |
| Leader group of Beijing quality and technology supervising office | A11000000423 | 249 | Real-time observing, real-time control, and locking/unlocking | 1101010609000001-1101010609000010 |
| High-level commander group of Beijing quality and technology supervising office | A11000000424 | 199 | Real-time observing and real-time control | 1101010609000020-1101010609000030 |
| Operator group of Beijing quality and technology supervising office | A11000000426 | 99 | Real-time observing | 1101010609000040-1101010609000050 |
| Leader group of Beijing administration of sanitation | A11000000103 | 248 | Real-time observing, real-time control, and locking/unlocking | 1101010609000001-1101010609000010 |
| High-level commander group of Beijing administration of sanitation | A11000000104 | 198 | Real-time observing and real-time control | 1101010609000020-1101010609000030 |
| Operator group of Beijing administration of sanitation | A11000000106 | 98 | Real-time observing | 1101010609000040-1101010609000050 |
| Leader group of Beijing administration for industry and commerce | A11000000363 | 247 | Real-time observing, real-time control, and locking/unlocking | 1101010609000001-1101010609000010 |
| High-level commander group of Beijing administration for industry and commerce | A11000000364 | 197 | Real-time observing and real-time control | 1101010609000020-1101010609000030 |
| Operator group of Beijing administration for industry and commerce | A11000000366 | 97 | Real-time observing | 1101010609000040-1101010609000050 |

Mr. ZHANG is a leader at Beijing quality and technology supervising office and belongs to the leader group of Beijing quality and technology supervising office; while Mr. LI is a leader at Beijing administration of sanitation and belongs to the leader group of Beijing administration of sanitation. In this case, the global user management unit writes the personal information of Mr. ZHANG and Mr. LI into their digital certificates respectively.

When Mr. ZHANG and Mr. LI desire to access a video source with a code of 1101010609000001 at a platform A, the platform A identifies, according to the predetermined correspondence relationship between the user set and the user group, that Mr. ZHANG belongs to a user set with a code of A11000000423, has an authority of real-time observing, real-time control and locking/unlocking, has a level of 249, and is capable of accessing video sources with codes of 1101010609000001-1101010609000010; further, the platform A identifies that Mr. LI belongs to a user set with a code of A11000000103, has an authority of real-time observing, real-time control and locking/unlocking, has a level of 248, and is capable of accessing video sources with codes of 1101010609000001-1101010609000010. The platform A determines that both of Mr. ZHANG and Mr. LI are capable of observing a video source with a code of 1101010609000001.

When both of Mr. ZHANG and Mr. LI desire to control the video source with the code of 1101010609000001 simultaneously, the platform A identifies that the level of a user group including Mr. ZHANG is larger than the level of a user group including Mr. LI according to predefined user groups, as a result, Mr. ZHANG has a priority of controlling the video source with the code of 1101010609000001 over Mr. LI.

In the case of emergency conditions, the platform determines the priority of a user according to the regulations of the emergency user group.

The invention claimed is:

1. A management system of sorting and classifying users of an image information management system, comprising:
   a number of subsystems which are the same and interconnected to each other, wherein the subsystem comprises a user information encoding module, a user information decoding and authority identifying module, a user sorting module, a user classifying module, a command executing module, a database of authorized user set and a resource information database;
   the resource information database contains real-time images, history images, and a control command on a pan head and a lens of a video camera;
   the user information encoding module is adapted to encode a use command, wherein the use command comprises a command to obtain the real-time image from the video camera, obtain the history image, or obtain control of the an head and lens of the video camera, and user personal information containing access level information into a digital string based on predefined rules, and transmit the digital string to the user information decoding and authority identifying module of the subsystem including the resource information indicated by the use command;

the user information decoding and authority identifying module is adapted to obtain a user record from the database of authorized user set, decode the user information contained in the received digital string, and compare the use command with an authorization record of the user in the database of authorized user set, in order to identify whether the user possesses an operation authority;

after the identification, the user sorting module is informed of the user possessing the operation authority, and transmits to the user classifying module a list of users each initiating access commands to the same resource within a certain time period; and the user classifying module is adapted to arrange orderly the users initiating the access commands to the same resource according to access levels, and send the use commands of the users to the command executing module in sequence for executing.

2. The management system of claim 1, further comprising an information feedback module adapted to send image information, which is obtained from executing a command by the command executing module, to a user indicated by the command.

3. The management system of claim 1, wherein the user personal information comprises user level information and information of identification of the subsystem containing the user personal information, both of which are encoded and indicated based on the given rule, and a user with a higher level has a priority of accessing the same resource information over a user with a lower level.

4. The management system of claim 2, wherein the user personal information comprises user level information and information of identification of the subsystem containing the user personal information, both of which are encoded and indicated based on the given rule, and a user with a higher level has a priority of accessing the same resource information over a user with a lower level.

5. The management system of claim 1, wherein the operation authority comprises an authority of obtaining the real-time images from the video camera, an authority of obtaining the history image, or an authority of controlling the pan head and lens of the video camera.

6. The management system of claim 2, wherein the operation authority comprises an authority of obtaining the real-time images from the video camera, an authority of obtaining the history image, or an authority of controlling the pan head and lens of the video camera.

7. The management system of claim 2, wherein the use command comprises a command to obtain the real-time image from the video camera, obtain the history image, or obtain control of the pan head and lens of the video camera.

8. The management system of claim 1, wherein, according to the use commands of the users, the user sorting module divides the users into users of obtaining the real-time image from the video camera, users of obtaining the history image, and users of obtaining an authority of controlling the pan head and lens of the video camera, and arranges respectively the users into a list of users directed to the corresponding resource information.

9. The management system of claim 2, wherein, according to the use commands of the users, the user sorting module divides the users into users of obtaining the real-time image from the video camera, users of obtaining the history image, and users of obtaining an authority of controlling the pan head and lens of the video camera, and arranges respectively the users into a list of users directed to the corresponding resource information.

10. The management system of claim 1, wherein the user classifying module sorts, from a high priority to a low priority, the users in the user list from the user sorting module by sorting the priority of accessing the real-time image from the video camera, accessing the history image, and controlling the pan head and lens of the video camera, and sends the priorities to the command executing module in sequence for executing.

11. The management system of claim 2, wherein the user classifying module sorts, from a high priority to a low priority, the users in the user list from the user sorting module by sorting the priority of accessing the real-time image from the video camera, accessing the history image, and controlling the pan head and lens of the video camera, and sends the priorities to the command executing module in sequence for executing.

12. The management system of claim 1, wherein the resource information database is divided into a number of sub-databases containing various resource information according to given rules.

13. The management system of claim 2, wherein the resource information database is divided into a number of sub-databases containing various resource information according to given rules.

14. The management system of claim 1, further comprising a global control station connected to all of the subsystems, wherein the global control station is provided with a database of authorized user set comprising all of records in the database of authorized user set of each of the subsystems.

15. The management system of claim 2, further comprising a global control station connected to all of the subsystems, wherein the global control station is provided with a database of authorized user set comprising all of records in the database of authorized user set of each of the subsystems.

16. The management system of claim 14, wherein the global control station is further provided with all of modules of the subsystems.

* * * * *